Patented July 19, 1949

2,476,821

UNITED STATES PATENT OFFICE 2,476,821

STABILIZED COPOLYMER OF BUTADIENE AND STYRENE

Harry E. Albert, Akron, Ohio, assignor to The Firestone Tire & Rubber Company, Akron, Ohio, a corporation of Ohio No Drawing. Application August 13, 1945, Serial No. 610,684

20 Claims. (Cl. 260—45.75)

This invention relates to the stabilization of rubber-like copolymers of butadiene and styrene —both uncured and cured—with diaryl arsine and stibine sulfides, including di-(hydrocarbon-substituted aryl) arsine and stibine sulfides. Preferred stabilizers of this invention include diphenyl arsine sulfide, $[(C_6H_5)_2As]_2S$, and diphenyl stibine sulfide, $[(C_6H_5)_2Sb]_2S$. Other stabilizers of the invention include ditolyl, dixylyl, di-(diethylphenyl), di-(biphenyl), di-cyclohexylphenyl, dinaphthyl, di-isopropylnaphthyl, etc., arsine sulfides and stibine sulfides.

Various rubber antioxidants have been found to stabilize the rubber-like copolymers of butadiene and styrene, but such stabilization is usually accompanied by discoloration of the copolymer. The stabilizers of this invention cause relatively little discoloration. Diphenyl stibine sulfide, one of the stabilizers of this invention, has been found to accelerate the vulcanization of the copolymer. That is evident from the data given below.

In the accompanying tables the properties of GR-S rubber (a copolymer of butadiene and styrene) stabilized according to this invention are compared with the same material, identically compounded and treated, but stabilized with phenyl betanaphthylamine, one of the recognized stabilizers of such products.

The results in the first table were obtained from the aluminum sulfate coagulum of uncured GR-S latex to which, before coagulation, 2 per cent of the stabilizer was added. Each coagulum obtained with crude aluminum sulfate was first washed with water and then milled without water before testing. The polymer samples were dried for twenty-four hours at 75° C. and then aged for four days in a forced-draft, air-circulation oven at 90° C. The measure of the deterioration of the polymer during the aging period is the stiffening produced. This stiffening is measured by extrusion plasticity and by hand tests or "feel." It is known that without a stabilizer such copolymer could not be dried without losing a large portion or practically all of its rubbery properties. For purposes of comparison, there is included in the table as a blank the results which would be obtained if the same copolymer, unstabilized, were subjected to the same heating. The figures given in the table were obtained in tests with an instrument of the type described in U. S. Patent 2,045,548 to J. H. Dillon et al. and known as the Firestone extrusion plastometer. The figures are a measure of the time required to extrude a constant volume of rubber through a given opening by action of a piston activated by a constant pressure of 8¼ pounds steam at a constant temperature of 185° F.

| Stabilizer | After Drying 20 Hrs. at 75° C. | Heat-aged 2 Days at 90° C. | Heat-aged 4 Days at 90° C. |
|---|---|---|---|
| Blank | somewhat hardened | hardened | hardened. |
| 2% Diphenyl arsine sulfide | 14.8 light brown; ok | 24.8 light brown; sl. set up | 33.8 light brown; somewhat set up. |
| 2% Diphenyl stibine sulfide | 16.5 light brown; ok | 54.8 light brown; somewhat set up | 48.8 light brown; somewhat set up. |
| 2% Phenyl betanaphthylamine | 14.5 brown; ok | 41.0 dark brown; somewhat set up | 48.0 dark brown; somewhat set up. |

(In the table "sl." means "slightly." "ok" means no appreciable oxidation, determinable by feel, had set in.)

There is a great difference between the behavior on drying and in polymer aging of a blank (no antioxidant or stopping agent) coagulated with crude aluminum sulfate (containing about 0.4 to 1.0 per cent iron) and one coagulated with low-iron or pure aluminum sulfate (less than 0.4 per cent iron). The stabilizers of this invention serve as antioxidant and stopping agents for coagulum and vulcanized copolymers obtained therefrom, whether or not the coagulating agent contains iron.

The following table records the physical properties of the cured copolymer containing certain stabilizers of the invention and compares them with a control in which phenyl betanaphthylamine is used as a stabilizer. All three materials were compounded as follows from GR-S coagulated with crude aluminum sulfate to which the stabilizer was added, as above, before coagulation:

|  | Parts |
|---|---|
| GR-S containing stabilizer | 100 |
| Neutral coal tar | 3 |
| Pine tar | 3 |
| Stearic acid | 3 |
| Zinc oxide | 5 |
| N-cyclohexylbenzothiazyl sulfenamide | 1.2 |
| Channel black | 50 |
| Sulfur | 2 |

*Material cured at 280° F.*

| | 300% Modulus | | | | 400% Modulus | | | | Tensile | | | | Elongation | | | | Extrusion Plasticity |
|---|---|---|---|---|---|---|---|---|---|---|---|---|---|---|---|---|---|
| | 40' | 60' | 80' | 120' | 40' | 60' | 80' | 120' | 40' | 60' | 80' | 120' | 40' | 60' | 80' | 120' | |
| Diphenyl arsine sulfide | 600 | 800 | 1025 | 1075 | 900 | 1250 | 1375 | 1600 | 2250 | 2700 | 2725 | 2550 | 760 | 670 | 590 | 550 | 6.0 |
| Control | 525 | 850 | 950 | 1000 | 825 | 1300 | 1550 | 1765 | 1850 | 2000 | 1900 | 1675 | 680 | 560 | 460 | 420 | 7.8 |
| Diphenyl stibine sulfide | 1475 | 1925 | 2075 | 2150 | 2200 | | | | 2300 | 2525 | 2075 | 2425 | 410 | 390 | 300 | 310 | 21.2 |
| Control | 775 | 1100 | 1375 | 1600 | 1175 | 1725 | 2025 | 2325 | 2075 | 2500 | 2275 | 2125 | 600 | 510 | 450 | 400 | 10.1 |

The following results were obtained on the above stocks (cured at 280° F. for 80 minutes) on certain ball-rebound apparatus designed for the purpose. The first table shows that the heat build-up with 250 pounds load and an offset of 0.3 inch. The blowout test was conducted under 550 pounds load using an offset of 0.4 inch.

| | Heat Build-up | | | | Blowout Test | | | Rebound | | |
|---|---|---|---|---|---|---|---|---|---|---|
| | 3# Pen. | | Per Cent Def. | °F. | Per Cent Def. | Min. | Condition | 0° C. | 26° C. | 100° C. |
| | Hot | Cold | | | | | | | | |
| Diphenyl arsine sulfide | 41 | 68 | 20.0 | 296 | 39.3 | 15 | split | 27.0 | 40.2 | 50.7 |
| Control | 39 | 67 | 20.0 | 296 | 39.3 | 17 | ...do... | 27.5 | 42.7 | 50.5 |
| Diphenyl stibine sulfide | 33 | 52 | 13.3 | 262 | 27.3 | 27 | blown | 28.0 | 46.2 | 61.0 |
| Control | 36 | 61 | 18.0 | 289 | 32.7 | 19 | split | 28.0 | 43.0 | 53.7 |

As shown above, the stabilizers of this invention produce satisfactory rubbers. The products are stabilized with only slight discoloration, a decided improvement over stabilization with phenyl beta-naphthylamine. The amount of stabilizer may be varied considerably, from about 0.1 per cent to 10 per cent or more, for example, and other conditions may be changed from those given without departing from the invention as defined in the appended claims.

What I claim is:

1. Rubber-like copolymer of butadiene and styrene stabilized with 0.1 to 10 per cent of a sulfide of the class consisting of diaryl stibine sulfides and diaryl arsine sulfides.

2. Rubber-like copolymer of butadiene and styrene stabilized with 0.1 to 10 per cent of a diaryl stibine sulfide.

3. Rubber-like copolymer of butadiene and styrene stabilized with 0.1 to 10 per cent of a diaryl arsine sulfide.

4. Vulcanized, rubber-like copolymer of butadiene and styrene stabilized with about 0.1 to 10 per cent of a sulfide of the class consisting of diaryl stibine sulfides and diaryl arsine sulfides.

5. Vulcanized, rubber-like copolymer of butadiene and styrene stabilized with 0.1 to 10 per cent of a diaryl stibine sulfide.

6. Vulcanized, rubber-like copolymer of butadiene and styrene stabilized with 0.1 to 10 per cent of a diaryl arsine sulfide.

7. Vulcanized, rubber-like copolymer of butadiene and styrene stabilized with 0.1 to 10 per cent of diphenyl stibine sulfide.

8. Vulcanized, rubber-like copolymer of butadiene and styrene stabilized with 0.1 to 10 per cent of diphenyl arsine sulfide.

9. The method of stabilizing uncured rubber-like copolymer of butadiene and styrene while drying which comprises drying by heating the same in admixture with 0.1 to 10 per cent of a sulfide of the class consisting of diaryl stibine sulfides and diaryl arsine sulfides, as a stabilizer.

10. The method of stabilizing uncured rubber-like copolymer of butadiene and styrene while drying which comprises drying by heating the same in admixture with 0.1 to 10 per cent of a diaryl stibine sulfide, as a stabilizer.

11. The method of stabilizing uncured rubber-like copolymer of butadiene and styrene while drying which comprises drying by heating the same in admixture with 0.1 to 10 per cent of a diaryl arsine sulfide, as a stabilizer.

12. The method of stabilizing uncured rubber-like coagulum of copolymer of butadiene and styrene coagulated with crude iron-containing aluminum sulfate while drying which comprises drying by heating the same in admixture with 0.1 to 10 per cent of a sulfide of the class consisting of diaryl stibine and arsine sulfides, as a stabilizer.

13. The method of stabilizing uncured rubber-like coagulum of copolymer of butadiene and styrene coagulated with crude iron-containing aluminum sulfate while drying which comprises drying by heating the same in admixture with 0.1 to 10 per cent of a diaryl stibine sulfide, as a stabilizer.

14. The method of stabilizing uncured rubber-like coagulum of copolymer of butadiene and styrene coagulated with crude iron-containing aluminum sulfate while drying which comprises drying by heating the same in admixture with 0.1 to 10 per cent of a diaryl arsine sulfide, as a stabilizer.

15. The method of stabilizing rubber-like copolymer of butadiene and styrene while curing which comprises curing by heating the same in the presence of sulfur and as a stabilizer 0.1 to 10 percent of a sulfide of the class consisting of diaryl stibine and arsine sulfides.

16. The method of stabilizing rubber-like copolymer of butadiene and styrene while curing which comprises curing by heating the same in the presence of sulfur and as a stabilizer 0.1 to 10 per cent of a diaryl stibine sulfide.

17. The method of stabilizing rubber-like copolymer of butadiene and styrene while curing which comprises curing by heating the same in the presence of sulfur and as a stabilizer 0.1 to 10 percent of a diaryl arsine sulfide.

18. The process of preparing coagulum of rubber-like copolymer of butadiene and styrene, which comprises coagulating latex of the copolymer with crude aluminum sulfate containing 0.4 to 1.0 per cent iron and then drying the coagulum in the presence of 0.1 to 10 per cent of a sulfide of the class consisting of diaryl stibine sulfides and diaryl arsine sulfides, as a stabilizer.

19. The process of preparing coagulum of rubber-like copolymer of butadiene and styrene, which comprises coagulating latex of the copolymer with crude aluminum sulfate containing 0.4 to 1.0 per cent iron and then drying the coagulum in the presence of 0.1 to 10 per cent of a diaryl stibine sulfide.

20. The process of preparing coagulum of rubber-like copolymer of butadiene and styrene, which comprises coagulating latex of the copolymer with crude aluminum sulfate containing 0.4 to 1.0 per cent iron and then drying the coagulum in the presence of 0.1 to 10 per cent of a diaryl arsine sulfide.

HARRY E. ALBERT.

REFERENCES CITED

The following references are of record in the file of this patent:

UNITED STATES PATENTS

| Number | Name | Date |
| --- | --- | --- |
| 2,310,449 | Lightbown et al. | Feb. 9, 1943 |

Patent No. 2,476,821

Certificate of Correction

July 19, 1949

HARRY E. ALBERT

It is hereby certified that errors appear in the printed specification of the above numbered patent requiring correction as follows:

Columns 3 and 4, in the first table, ninth column thereof, for "1765" read *1675*; column 4, lines 40 and 61, for the words "stibine and arsine" read *stibine sulfides and diaryl arsine*;

and that the said Letters Patent should be read with these corrections therein that the same may conform to the record of the case in the Patent Office.

Signed and sealed this 13th day of December, A. D. 1949.

[SEAL]

THOMAS F. MURPHY,
*Assistant Commissioner of Patents.*